United States Patent [19]

Brand

[11] Patent Number: 4,801,667
[45] Date of Patent: Jan. 31, 1989

[54] PREPARATION OF A (CO)POLYMERIZABLE COMPOSITION CONTAINING A DIOL BIS(ALLYL CARBONATE) MONOMER AND A PROCESS BY WHICH THIS COMPOSITION IS (CO)POLYMERIZED

[75] Inventor: Johannes Brand, Schalkhaar, Netherlands

[73] Assignee: Akzo N.V., Arnhem, Netherlands

[21] Appl. No.: 135,468

[22] Filed: Dec. 21, 1987

Related U.S. Application Data

[63] Continuation of Ser. No. 1,389, Jan. 8, 1987, abandoned.

[30] Foreign Application Priority Data

Jan. 28, 1986 [NL] Netherlands .................... 8600183

[51] Int. Cl.$^4$ .................................................. C08G 65/38
[52] U.S. Cl. ................................ 526/213; 526/314; 526/232.1
[58] Field of Search ................. 526/232.1, 314, 213

[56] References Cited

U.S. PATENT DOCUMENTS 4,387,044  6/1983  Sanchez et al. .............. 526/232.1

*Primary Examiner*—Edward J. Smith
*Assistant Examiner*—Peter D. Mulcahy
*Attorney, Agent, or Firm*—Parkhurst, Oliff & Berridge

[57] ABSTRACT

A process for the preparation of a (co)polymerizable composition containing a diol bis(allyl carbonate) monomer and an aromatic diacyl peroxide comprising dissolving in said monomer a powdered peroxide composition in which the peroxide is mixed with an organic desensitizing agent, e.g. dicyclohexyl phthalate, which has a melting or softening point higher than 40° C. and forms 20–80% by weight of said peroxide composition. The process permits, with the aid of simple stirring equipment, to obtain good quality (co)polymerizable compositions at room temperature without vigorous stirring and in a relatively short time. Also disclosed is the (co)polymerization of the (co)polymerizable compositions thus prepared.

19 Claims, No Drawings

PREPARATION OF A (CO)POLYMERIZABLE COMPOSITION CONTAINING A DIOL BIS(ALLYL CARBONATE) MONOMER AND A PROCESS BY WHICH THIS COMPOSITION IS (CO)POLYMERIZED

This is a continuation of application Ser. No. 001,389, filed Jan. 8, 1987, now abandoned.

The invention relates to a process for the preparation of a (co)polymerizable composition containing a diol bis(allyl carbonate) monomer and an aromatic diacyl peroxide, the peroxide being used in the finely divided state in which it is dissolved in the monomer, and to a process in which this composition is (co)polymerized.

Processes of the type indicated above are known from the Market Development Bulletin No. 302, published on July 13, 1960 by Pittsburgh Plate Glass Company, Chemical Division. This publication relates to the use of dibenzoyl peroxide and diisopropyl peroxydicarbonate as initiators for diethylene glycol bis(allyl carbonate).

It is generally known that use is made of peroxides in the polymerization of diol bis(allyl carbonate) monomers, the polymers obtained being applied for producing optical objects such as corrective lenses, sunglass lenses, faceguard plates and masks, photographic filters, etc. The most usual peroxides for this purpose are aromatic diacyl peroxides, such as dibenzoyl peroxide, and dialkyl peroxydicarbonates, such as diisopropyl peroxydicarbonate. It is also known that the physical properties, such as impact strength, of products obtained by using aromatic diacyl peroxides are superior to those of products prepared by using dialkyl peroxydicarbonates. See, for instance, European Patent Application No. 81 984 A1. Particularly considering the disadvantages to the diisopropyl peroxydicarbonate widely used up to now as regards transport and storage, which must always take place at temperatures below $-10°$ C. because of its relatively high instability, the preferred initiators for diol bis(allyl carbonate) monomers are the aromatic diacyl peroxides.

So far the use for this purpose of aromatic diacyl peroxides has generally been confined to the pure or virtually pure substances. But there is the problem then, contrary to when use is made of dialkyl peroxydicarbonates, that in the preparation of the polymerizable composition, which is to precede the actual polymerization, difficulties are met in dissolving the peroxide in the monomer within a reasonable time. Notably for dibenzoyl peroxide this problem has long been recognized, as appears from, for instance, U.S. Pat. No. 2,542,386 (column 2, lines 44–48; column 4, lines 68–74) and from Modern Plastics, July 1956, p. 114. To solve this problem it is proposed in these publications that the monomer be heated (mention being made of temperatures of 55° C. and 70° C.) with simultaneous vigorous stirring. In the above-mentioned Market Development Bulletin, which is of a later date, it is recommended that the dibenzoyl peroxide be used in the form of powder or granules; if it is used in the form of granules, the monomer should be heated to about 50° C., with stirring; if used in the form of powder, the peroxide can be dissolved at room temperature, be it with vigorous stirring. The Bulletin mentions that a solution of 3% by weight of dibenzoyl peroxide in diethylene glycol bis(allyl carbonate) can be prepared then in a dissolving time of less than one hour.

To the steps proposed up to now to speed up the dissolution of pure or virtually pure aromatic diacyl peroxide in diol bis(allyl carbonate) monomer, however, there are several drawbacks. In the first place, vigorous stirring calls for the use of special, cumbersome stirrer constructions, which are unsuitable for production on an industrial scale. In the second place, vigorous stirring leads to an increase in area of contact with air, which inevitably results in absorption of water from the air. It should be realized that diol bis(allyl carbonate) monomers are hygroscopic. As a result, the monomer may be subject to hydrolysis which, in the case of, say, diethylene glycol bis(allyl carbonate) is attended with the formation of volatile compounds, such as allyl alcohol and acrolein. Not only are such compounds irritant to eyes and mucous membrane, but their presence during the actual polymerization has a negative effect on the rate of polymerization and on the adhesion of the polymer to the moulds to be used in the polymerization, such as glass moulds. In the third place, the heating of the monomer peroxide composition entails the risk of premature polymerization, which results in high viscous or gelled compositions which are not only difficult to process, but give rise, after polymerization, to inferior endproducts. In the fourth place, the dissolving time attainable so far are considered unacceptably long from the point of view of efficient production on an industrial scale.

The invention aims at meeting these drawbacks. It has been found that if instead of employing finely divided, pure or practically pure aromatic diacyl peroxide the dissolving process use is made of a powdered peroxide composition in which the aromatic diacyl peroxide is mixed with an organic desensitizing agent which has a melting or softening point higher than 40° C. and forms 20–80% by weight of the peroxide composition, it is possible with the aid of simple stirring equipment to obtain good quality (co)polymerizable compositions at room temperature without vigorous stirring and in a relatively short time.

An additional advantage in view of the more and more stringent rules laid down by law regarding transport and storage of hazardous materials, is that the peroxide compositions to be used are relatively safe; the transport of 98%-dibenzoyl peroxide, for instance, is prohibited in many countries.

It should be added that U.S. Pat. No. 4,387,044 (Example 12) describes a polymerization reaction of diethylene glycol bis(allyl carbonate) in which use is made of a peroxide composition consisting of 85% of dibenzoyl peroxide and 15% of dicyclohexyl phthalate. This patent specifiction, however, relates to the preparation of safe, dry, free-flowing, solid peroxide compositions desensitized with the aid of substituted or unsubstituted benzoic acid, said polymerization reaction merely serving as comparative example, and contains no teaching relating to the present invention.

The diol bis(allyl carbonate) monomers to be used in the (co)polymerizable composition are the well-known and generally commercially available liquid compounds. It is preferred that they correspond to the general formula:

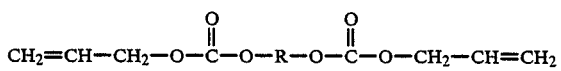

wherein R represents an alkylene group of which the chain is interrupted or not by one or more ether and/or carbonate functions.

The alkylene group R may be linear or branched and generally contains 2 to 10 carbon atoms. As examples of alkylene groups of which the chains are not interrupted by ether and/or carbonate functions may be mentioned ethylene, trimethylene, methyl ethylene, tetramethylene, ethyl ethylene, pentamethylene, hexamethylene, octamethylene and decamethylene. Examples of alkylene groups of which the chains are interrupted by one or more ether and/or carbonate functions are

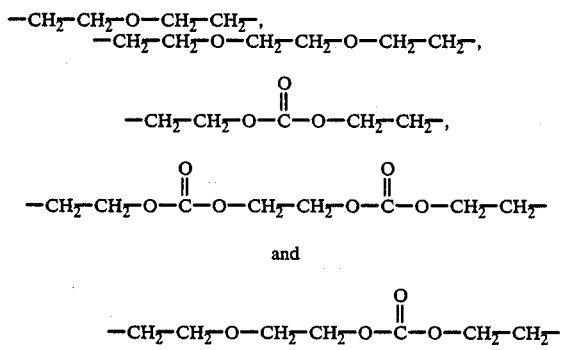

and

The diol bis(allyl carbonate) monomer which is the most preferred is diethylene glycol bis(allyl carbonate):

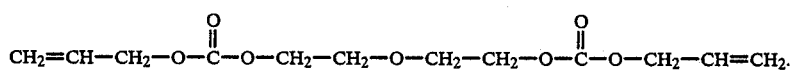

In addition to the monomer the (co)polymerizable composition may contain a comonomer. As examples of suitable comonomers may be mentioned vinyl acetate, (meth)acrylate esters, such as methyl acrylate and methyl methacrylate, triallyl(iso)cyanurate, diallyl phthalate, diallyl isophthalate and diallyl terephthalate. The amount thereof is generally not more than 30% by weight, calculated on the total of the monomers.

The peroxide compositions suitable for use in the preparation of the (co)polymerizable composition by the process according to the invention are also known in themselves, viz. from British Patent Specification No. 1 195 083; moreover, many of them are commercially available. The aromatic diacyl peroxides which are preferably used correspond to the general formula

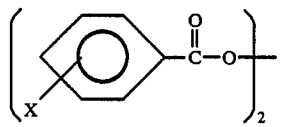

wherein X=H, CH₃ or OCH₃. As examples of suitable peroxides may be mentioned dibenzoyl peroxide, di(o-methylbenzoyl)peroxide and di(o-methoxybenzoyl)peroxide. Especially preferred are dibenzoyl peroxide and di(o-methylbenzoyl)peroxide. As regards the desensitizing agents to be used it should first of all be noted that in said British patent specification these compounds are referred to as plasticizers which are soluble in polymers derived from unsaturated polyester resins. However, these plasticizers also serve as desensitizing agent for the peroxide, and moreover the present invention is not at all concerned with polymers derived from unsaturated polyester resins.

As suitable desensitizing agents may be mentioned esters of the three isomeric benzene dicarboxylic acids, such as dicyclohexyl phthalate, dicyclohexyl terephthalate, di-n-octyl terephthalate, diisobutyl terephthalate, diethyl terephthalate and diphenyl phthalate, phosphoric esters, such as tri-p-tolyl phosphate, benzoic esters, such as phenyl benzoate, p-t-butylphenyl benzoate, α- and β-naphthyl benzoate, ehylene glycol dibenzoate and trimethylene glycol dibenzoate, sulphonamides, such as p-toluene sulphonamide and N-cyclohexyl-p-toluene sulphonamide, and chlorinate paraffins having a chlorined content higher than 70% by weight. Also combinations of desensitizing agents may be used. It is preferred that use should be made of dicyclohexyl phthalate.

As mentioned above, the desensitizing agent should form 20-80% by weight of the peroxide composition. If the desensitizing agent is used in an amount of less than 20% by weight, its favourable effect on the dissolving behaviour of the peroxide composition will be lost; if it is used in an amount higher than 80% by weight, it will retain its favourable effect on dissolving behaviour, but the properties of the endproducts obtained after (co)polymerization will be impaired, which particularly applies to the surface properties. It is preferred that the peroxide composition should contain the desensitizing agent in an amount of 35-75% by weight, more particularly 40-60% by weight.

Preparation of the peroxide composition may be accomplished in various ways. These are described in detail in said British patent specification. According to the present invention it is preferred that use be made of the procedure as described on page 3, lines 9-19 of said patent specification, the peroxide being prepared in the presence of the desensitizing agent. To this end a solution of the desensitizing agent in the aromatic acid chloride serving as starting material for the peroxide is brought into contact, with stirring, with an aqueous solution of sodium hydroxide and hydrogen peroxide, after which the peroxide composition crystallizes out from the solution. The powdered product obtained after filtration, washing and drying is directly suitable for use in the preparation of the (co)polymerizable composition.

The term powdered peroxide composition as used in the description of the present invention refers to a peroxide composition of which the particle size is generally ≦1 mm.

The amount of peroxide composition to be used in the preparation of the (co)polymerizable composition by the process according to the invention is generally as chosen that the (co)polymerizable composition contains 0.5-6% by weight of aromatic diacyl peroxide, calculated on the weight of the monomer and, if also used, the comonomer. As mentioned before, the process may be carried out with the aid of simple stirring apparatus. A typical example of such an apparatus is the well-known propeller mixer, which is often used in industry.

Finally, it should still be added that the (co)polymerizable composition may also contain the additives normally used for such compositions. As examples of such additives may be mentioned release agents, such as Ortholeum®162 (a commercial product of Du Pont, which is a mixture of monoalkyl phosphates and dialkyl phosphates), ethylene glycol and dioctyl phthalate, and UV absorbing compounds, such as the 2-hydroxy-4-alkoxy benzophenones described in European Patent Application No. 81 984 A1. Such compounds may be added to the monomer before, during or after dissolving the peroxide composition by the method according to the invention.

After preparing the (co)polymerizable composition it can be (co)polymerized under the conditions usual for such compositions, as described in, for instance, U.S. Pat. No. 2,542,386 and European Patent Application No. 81 984 A1.

The invention will be further described in the following examples.

EXAMPLE 1

This example compares dissolving times in diethylene glycol bis(allyl carbonate) of granular (particle size about 3 mm) and powdered (particle size ≦1 mm) dibenzoyl peroxide (BPO) on the one hand and powdered (particle size ≦1 mm) peroxide compositions consisting of mixtures of dibenzoyl peroxide and dicyclohexyl phthalate (BPO/DCHP) on the other.

The preparation of the polymerizable compositions was carried out as follows. To 350 ml of the monomer in a double-walled 500 ml-reaction vessel there was added, with stirring (using a propeller mixer, stirring speed 275 rpm), such an amount of BPO or BPO/DCHP that the final polymerizable composition contained 2% by weight of BPO, based on the monomer.

The dissolving time needed to obtain a homogeneous solution was determined visually.

The amounts of BPO or BPO/DCHP added and the observed dissolving times are given in Table 1. The results clearly show that preparation of the polymerizable composition by the process according to the invention leads to shorter dissolving times than the processes in which use is made of the powdered or granular pure dibenzoyl peroxide recommended up to now in the prior art.

TABLE 1

| Peroxide (composition) | Dissolving time |
| --- | --- |
| 7 grammes of BPO, granular* | 118 min |
| 7 grammes of BPO, powdered* | 45 min |
| 20 grammes of BPO/DCHP 35/65 (w/w) | 9 min |
| 14 grammes of BPO/DCHP 50/50 (w/w) | 15 min |
| 9,3 grammes of BPO/DCHP 75/25 (w/w) | 35 min |

*comparative experiment

EXAMPLE 2

In this example it is demonstrated that (co)polymerization of (co)polymerizable compositions prepared by the process according to the invention leads to end-products of which the properties are quite comparable with those of products obtained by using powdered pure peroxide under otherwise the same conditions.

(Co)polymerizable compositions were prepared in the same way as described in Example 1, except that use was made of the peroxides (particle size ≦1 mm), peroxide compositions (particle size ≦1 mm) and monomers given in Table 2, below. Subsequently, (co)polymerization reactions were carried out by which round, flat plates having a thickness of 4 mm and a diameter of 65 mm were made. The procedure was as follows. A polymerization mould formed of two glass plates kept in their position by a clamp and separated by a resilient gasket was filled with a (co)polymerizable composition, after which the system was heated to a temperature of 70° C.; subsequently, the temperature was linearly increased to 90° C. at a rate of 1.2° C. per hour. After cooling the mould halves were removed and the flat plate was ready.

Of the plates thus manufactured the following parameters were determined:
  indentation hardness, which was measured in accordance with ASTM D2240-68 and is expressed in Shore D;
  transmission after dyeing, which parameter is considered an accurate measure of the hardness of the material right at the surface: the harder it is, the less it will tend to absorb pigments. The determination was carried out as follows. A plate was kept in a hot (92°–94° C.), maroon type pigment-containing aqueous solution. After washing and drying the transmission was determined in a spectrophotometer at 420 nm, air being used as a blank. The transmission is expressed in %: the higher the transmission, the harder the surface. (A plate not treated with a pigment shows a transmission of 90–92%).

The results are given in Table 2. In this table the following abbreviations are used:
  BPO: dibenzoyl peroxide
  MBPO: di(o-methylbenzoyl)peroxide
  DCHP: dicyclohexyl phthalate
  DBA: diethylene glycol bis(allyl carbonate)
  VA: vinyl acetate
  MMA: methyl methacrylate With the exception of the transmission results all percentages are percentages by weight.

TABLE 2

| Peroxide (composition) | | | Indentation hardness (Shore D) | Transmission after dyeing (%) |
| --- | --- | --- | --- | --- |
| nature | amount (%) | Monomer(s) | | |
| BPO* | 2 | DBA | 85 | 54 |
| MBPO* | 4,5 | DBA | 85 | 52 |
| 50% BPO/50% DCHP | 4 | DBA | 86 | 53 |
| 50% BPO/50% DCHP | 1,6 | 80% DBA/20% VA | 86 | 54 |
| 50% BPO/50% DCHP | 3,2 | 80% DBA/20% MMA | 85 | 52 |
| 50% MBPO/50% DCHP | 3 | 80% DBA/20% VA | 86 | 51 |

*comparative experiment
based on the monomer(s)

I claim:

1. A process for the preparation of a polymerizable composition containing a diol bis(allyl carbonate) monomer and a finely divided aromatic diacyl peroxide polymerization initiator, comprising mixing the aromatic diacyl peroxide with an organic densensitizing agent to produce a powdered peroxide composition, the desensitizing agent being selected from the group consisting of esters of isomeric benzene dicarboxylic acids and mixtures thereof, having a melting or softening point higher than 40° C. and forming 20–80% by weight of the peroxide composition; and dissolving the peroxide composition in the monomer.

2. A process according to claim 1, wherein the diol bis(allyl carbonate) monomer corresponds to the formula:

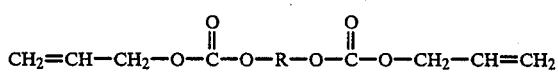

wherein R represents an alkylene group of which the chain may be interrupted or not by one or more ether and/or carbonate functions.

3. A process according to claim 2, wherein

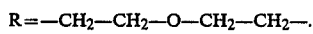

4. A process according to claim 1, wherein the peroxide corresponds to the formula

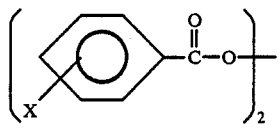

wherein $X = H$, $CH_3$ or $OCH_3$.

5. A process according to claim 4, wherein the peroxide is dibenzoyl peroxide or di(o-methylbenzoyl) peroxide.

6. A process according to claim 1, wherein the desensitizing agent is at least one ester of isomeric benzene dicarboxylic acids selected from the group consisting of dicyclohexyl phthalate, dicyclohexyl terephthalate, di-n-octyl terephthalate, diisobutyl terephthalate, diethyl terephthalate and diphenyl phthalate.

7. A process according to claim 1, wherein the desensitizing agent is dicyclohexyl phthalate.

8. A process according to claim 1, wherein the particle size of the peroxide composition is less than or equal to 1 mm.

9. A process for the polymerization of a diol bis(allyl carbonate) monomer, comprising heating a composition of monomer in the presence of an aromatic diacyl peroxide initiator, said composition having been prepared by the process according to claim 1.

10. A process for the preparation of a copolymerizable composition containing a diol bis(allyl carbonate) comonomer, at least one other comonomer, and a finely divided aromatic diacyl peroxide polymerization initiator, comprising mixing the aromatic diacyl peroxide with an organic desensitizing agent to produce a powdered peroxide composition, the desentizing agent being selected from the group consisting of esters of isomeric benzene dicarboxylic acids and mixtures thereof, having a melting or softening point higher than 40° C. and forming 20–80% by weight of the peroxide composition; and dissolving the peroxide composition in the comonomers.

11. The process of claim 10, wherein said other comonomer is selected from the group consisting of vinyl acetate, (meth)acrylate ester, triallyl (iso)cyanurate, diallyl phthalate, diallyl isophthalate, diallyl terephthalate and mixtures thereof.

12. A process according to claim 10, wherein the diol bis(allyl carbonate) comonomer corresponds to the formula:

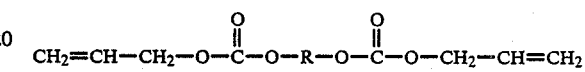

wherein R represents an alkylene group of which the chain may be interrupted or not by one or more ether and/or carbonate functions.

13. A process according to claim 12, wherein

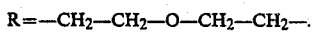

14. A process according to claim 10, wherein the peroxide composition corresponds to the formula

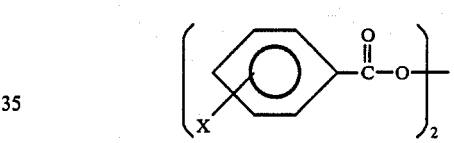

wherein $X = H$, $CH_3$ or $OCH_3$.

15. A process according to claim 14, wherein the peroxide is dibenzoyl peroxide or di(o-methylbenzoyl) peroxide.

16. A process according to claim 10, wherein the desensitizing agent is at least one ester of isomeric benzene dicarboxylic acids selected from the group consisting of dicyclohexyl phthalate, dicyclohexyl terephthalate, di-n-octyl terephthalate, diisobutyl terephthalate, diethyl terephthalate and diphenyl phthalate.

17. A process according to claim 10, wherein the desensitizing agent is dicyclohexyl phthalate.

18. A process according to claim 11, wherein the particle size of the peroxide composition is less than or equal to 1 mm.

19. A process for the (co)polymerization of a diol bis(allyl carbonate) comonomer and at least one other comonomer, comprising heating a composition comprising a mixture of comonomers in the presence of an aromatic diacyl peroxide initiator, said composition having been prepared by the process according to claim 10.

* * * * *

UNITED STATES PATENT AND TRADEMARK OFFICE
CERTIFICATE OF CORRECTION

PATENT NO. : 4,801,667
DATED : January 31, 1989
INVENTOR(S) : Johannes BRAND

It is certified that error appears in the above-identified patent and that said Letters Patent is hereby corrected as shown below:

Column 4, line 10, change "ehylene" to --ethylene--;

line 14, change "chlorined" to --chlorine--.

Column 6, in TABLE 2, change all commas to periods.

Column 7, in Claim 1, line 5, change "densensitizing" to --desensitizing--.

Column 8, in Claim 10, line 3, change "desentizing" to --desensitizing--.

Signed and Sealed this

Twenty-fifth Day of July, 1989

Attest:

DONALD J. QUIGG

Attesting Officer      Commissioner of Patents and Trademarks